April 2, 1929.  H. A. McDANIEL  1,707,312
PIPE JOINT
Filed Dec. 20, 1927
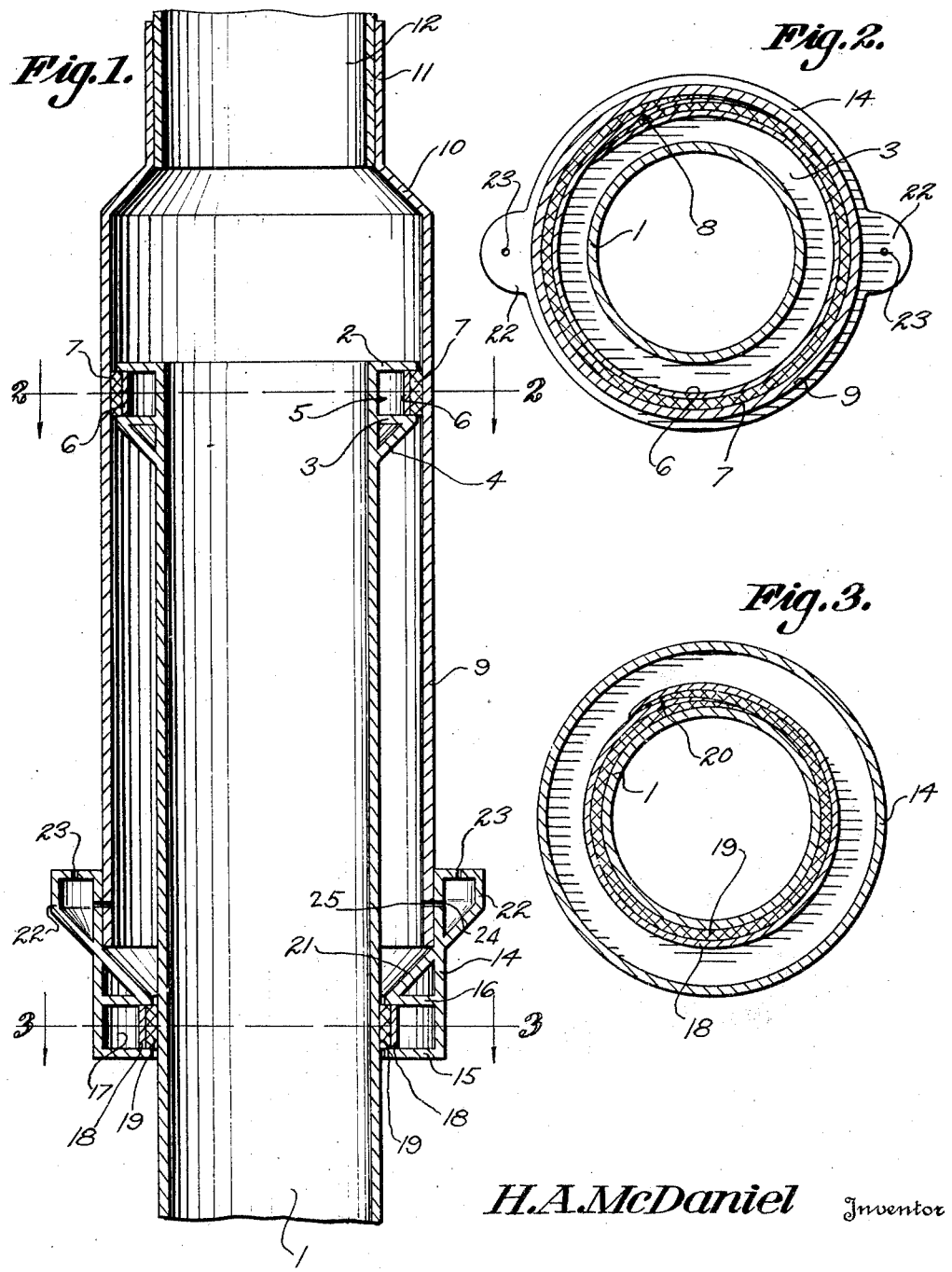
H. A. McDaniel Inventor
by CASnow&Co.
Attorneys Patented Apr. 2, 1929.

1,707,312

UNITED STATES PATENT OFFICE.

HILLERY A. McDANIEL, OF MEXIA, TEXAS.

PIPE JOINT.

Application filed December 20, 1927. Serial No. 241,344.

This invention aims to provide a novel form of joint for pipes, and particularly for pipes of the kind that are used to carry a blast about gin houses, in the cotton industry. The invention aims to provide a slip joint which will be practically air-tight, it being possible to produce relative longitudinal movement between the pipe sections, readily, at the will of an operator.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in longitudinal section, a device constructed in accordance with the invention;

Figure 2 is a cross section on the line 2—2 of Figure 1;

Figure 3 is a cross section on the line 3—3 of Figure 1.

The device forming the subject matter of this application comprises a plurality of pipe sections, sometimes fashioned out of galvanized sheet metal. The inner pipe section is marked by the numeral 1 and is provided at one end with an outstanding first flange 2 and with an outstanding second flange 3, the flanges 2 and 3 being parallel, and being located at right angles to the axis of the inner pipe section 1. The flanges 2 and 3 form a circumscribing groove 5 in the section 1, near to one end of that section. An inclined band 4 is joined at its outer edge to the outer edge of the second flange 3, and at its inner edge to the section 1, the band 4 serving as a reinforcement for the second flange 3. In the groove 5 is mounted a radially expansible packing made up of a ring 6, generally formed of metal, a packing strip 7 being secured to the ring 6, the ends of the ring 6 and the packing strip 7 being slidably overlapped, as at 8.

At one end, the inner section 1 extends into an outer pipe section 9 which may be reduced as at 10 to form a neck 11 whereby tubing 12 is connected. The packing 6—7 expands radially in the groove 5 of the inner section 1 and bears against the inner surface of the outer pipe section 9 for two purposes: First, to provide an air-tight joint; and, second, to hold the inner section 1 and the outer section 9 against relative longitudinal movement, saving when a strong force is exerted either on the outer pipe section 9 or on the inner pipe section 1 in a direction parallel to the axis of the pipe sections. The ring 6 is of considerable strength, and expands the packing with sufficient force so that the packing has a strong grip on the outer pipe section 9 and tends to prevent relative sliding movement between the pipe sections, saving when considerable force is applied to one of the pipe sections, as aforesaid.

The device includes a collar 14 of such diameter that one end of the outer pipe section 9 can be received closely but slidably therein, as shown in Figure 1. The collar 14 is provided at one end with a first flange 15, and has a second flange 16, spaced from the flange 15, the flanges 15 and 16 defining a circumscribing groove 17. The flange 16 is reinforced by an inclined band 21, the inner edge of the band 21 being joined to the inner edge of the flange 16, and the outer edge of the band 21 being joined to the collar 14, the band 21 being parallel to the corresponding band 4 of the inner pipe section 1, the construction being such that, if the inner section 1 is pulled far enough out of the outer pipe section 9, the parts 4 and 21 will come together in surface contact. Within the circumscribing groove 17 formed by the flanges 15 and 16, is located a prehensile packing including a ring 18 of metal, and a packing strip 19 secured to the inner surface of the ring 18, the ring and the packing strip having overlapped ends as shown at 20. The packing mechanism above described grips the inner pipe section 1 closely, and not only affords a practically air-tight joint, but, as well, aids in preventing relative longitudinal slanting movement between the collar 14 and the inner pipe section 1, saving upon the application of considerable force.

Any desired number of oil cups 22 are mounted upon the collar 14, the oil being introduced into the cups 22 through openings 23. The collar 14 has transverse ports 24 communicating with the oil cups 22, and adapted to register with ports 25 formed in the outer pipe section 9. The oil which finds its way through the registering ports 24 and 25 is directed by the inclined band 21, upon the outer surface of the pipe section 1, so that there is lubrication where the pipe section 1 slides through the prehensile packing 18—19. Moreover, some of the oil will adhere to the inner surface of the pipe section 9 and will lubricate the packing strip 7, as that packing slides upon the inner surface of the outer pipe section 9.

The device forming the subject matter of this application is simple in construction, but will afford a strong and practically air-tight connection between pipe sections.

What is claimed is:—

1. In a device of the class described, an outer pipe section, an inner pipe section extended into the outer pipe section, a collar receiving one end of the outer pipe section, the collar having flanges defining a circumferential internal groove, a packing in the groove and extended about the inner pipe section, the collar being provided with an inclined band connected to one flange, and an oil cup on the collar and including means for discharging oil on the band, the band constituting means for directing the oil upon the packing and upon the outer surface of the inner pipe section.

2. In a device of the class described, an outer pipe section, an inner pipe section, the inner pipe section being extended into the outer pipe section and being provided with a circumscribing groove, a collar receiving one end of the outer pipe section and having a circumscribing groove, an expansible packing in the groove of the inner pipe section and engaging the inner surface of the outer pipe section, a prehensile packing in the groove of the collar and engaged about the inner pipe section, an oil cup on the collar, the oil cup and the outer section having registering ports, and the collar being provided with an inclined member which receives oil and directs it between the prehensile packing and the inner pipe section.

In testimony that I claim the foregoing as my own, I have hereto affixed my signature.

HILLERY A. McDANIEL.